July 14, 1925.
McGARVEY E. TATE
1,546,043
RESILIENT INNER LINER FOR PNEUMATIC TIRES
Filed May 22, 1924
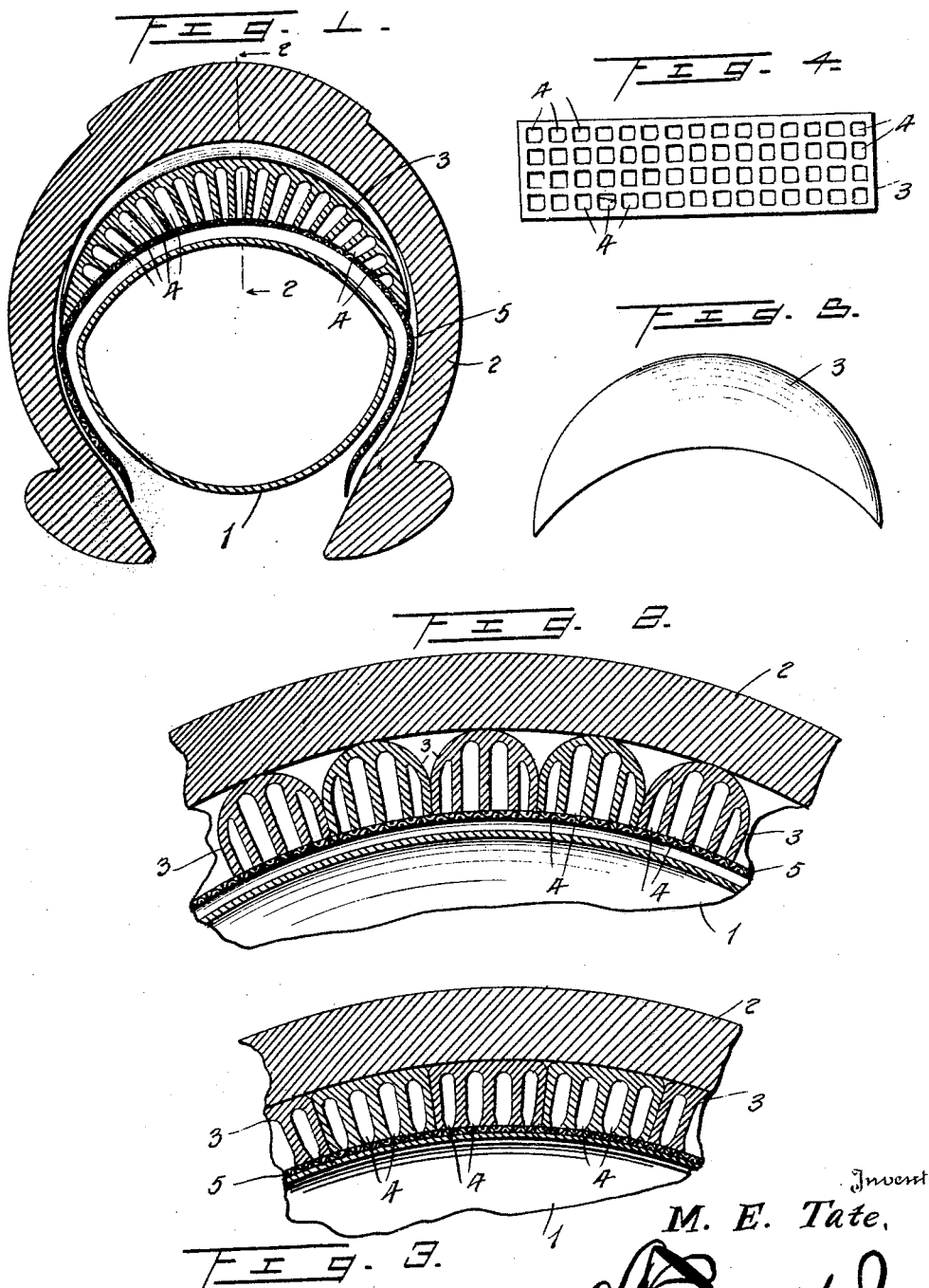

Patented July 14, 1925.

1,546,043

UNITED STATES PATENT OFFICE.

McGARVEY E. TATE, OF SOMERSET, KENTUCKY.

RESILIENT INNER LINER FOR PNEUMATIC TIRES.

Application filed May 22, 1924. Serial No. 715,197.

*To all whom it may concern:*

Be it known that I, McGARVEY E. TATE, a citizen of the United States, residing at Somerset, in the county of Pulaski and State of Kentucky, have invented certain new and useful Improvements in Resilient Inner Liners for Pneumatic Tires; and I do hereby declare the following to be a full, clear, and exact description of the invention, such as will enable others skilled in the art to which it appertains to make and use the same.

This invention relates to inner liners for pneumatic tires, and has for its primary object the provision of a resilient device of this character which will prevent punctures and blowouts and which will permit the use of under inflated tires without in the least reducing their elasticity or subjecting them to undue wear.

A further object of the invention is the provision of a resilient inner liner which may be readily secured in place against any circumferential or transverse movement with respect to the tire casing and inner tube, which shall be simple and durable, and which may be manufactured and sold at a comparatively low cost.

With the above and other objects in view, the invention consists in the construction, combination and arrangement of parts hereinafter fully described and claimed, and illustrated in the accompanying drawing, wherein:

Figure 1 is a transverse sectional view of a pneumatic tire equipped with a resilient inner liner constructed in accordance with my invention, the inner liner being shown as it appears before the inflation of the inner tube, Figure 2 is a sectional view of fragmentary portions of the tire and inner liner, taken on the plane indicated by the line 2—2 of Figure 1, Figure 3 is a view similar to Figure 2 illustrating the inner liner as it appears after the inflation of the inner tube, Figure 4 is a detail plan view of one of the resilient blocks or elements of the inner liner, and Figure 5 is a detail view in side elevation of one of the resilient blocks or elements.

Referring to the drawing by reference numerals, 1 designates the inner tube and 2 the casing of a pneumatic tire which may be of any construction.

The inner liner comprises an annular series of resilient blocks or elements 3 which are preferably made of rubber and which are of crescent formation in longitudinal section and of substantially segmental formation in transverse section. The blocks 3 are provided with longitudinal rows of radial cells or cavities 4 which open out through the inner concave sides thereof. The blocks 3 are arranged transversely of and secured at their inner sides to an annular sleeve 5 with the inner portions of their lateral sides in contact. The sleeve 5, which in addition to constituting a carrier for the blocks 3 functions as a closure for the open ends of the cells or cavities 4, may be made of any flexible material such as fabric, and it is open at its inner periphery to permit it to be applied to the inner tube 1. The blocks 3 may be vulcanized or cemented to the sleeve 5 or they may be secured thereto in any other suitable manner.

In practice, the inner liner is adapted to be positioned in the tire with its sleeve 5 surrounding the inner tube 1 and with its blocks 3 located between and extending transversely of the tread portions of the inner tube 1 and casing 2. Due to their transverse configuration, the lateral sides of the blocks 3 are out of full contact with each other before the inner tube 1 is inflated, as shown in Figures 1 and 2. When the inner tube 1 is inflated, the air in the blocks 3 is compressed and the blocks are under radial and circumferential compression. When the blocks 3 are compressed, their outer sides form a continuous surface for contact with the inner side of the tread portion of the tire casing 2, and their lateral sides are in full contact with each other.

The inner liner constitutes an elastic element located between the inner tube and casing of the tire and extending practically over the entire outer side of the inner tube. The elasticity of the inner liner is such that a comparatively small inner tube may be used or the tire may be used in an under inflated condition without reducing its resiliency or subjecting it to undue wear. As the sleeve 5 embraces the inner tube, those portions of the sleeve projecting inwardly beyond the ends of the blocks 3 will be clamped between the inner tube 1 and the casing 2 when the former is inflated. Owing thereto and due to the pressure exerted by the inner tube 1 upon the inner liner and the pressure exerted by the inner liner upon the casing 2, the inner liner cannot move circumferentially or transversely with respect to the inner tube and casing. As the blocks 3 extend practically over the outer half of the inner tube, the latter cannot be punctured, and as they are secured to the sleeve 5 only at their inner sides any one or more of them may be renewed when occasion requires.

What is claimed is:—

1. An inner liner for pneumatic tires, comprising an annular series of elastic blocks provided with cells opening out through the inner sides thereof, said blocks being of substantially segmental formation in transverse section, and a flexible member to which the blocks are secured at their inner sides.

2. An inner liner for pneumatic tires, comprising an annular series of elongated elastic blocks provided with cells opening out through the inner sides thereof, said blocks being of crescent formation in longitudinal section and of substantially segmental formation in transverse section, and a flexible member to which the blocks are secured at their inner sides.

3. An inner liner for pneumatic tires, comprising an annular series of elastic blocks of elongated formation and provided with cells opening out through the inner sides thereof, said blocks being of substantially segmental formation in transverse section, and a flexible member to which the blocks are secured at their inner sides with the inner portions of their lateral sides in contact.

4. An inner liner for pneumatic tires, comprising a flexible member, and elongated elastic blocks of substantially segmental formation in transverse section arranged on and secured to said member with portions of their lateral sides in contact.

5. An inner liner for pneumatic tires, comprising a flexible member, and elongated elastic blocks of substantially segmental formation in transverse section arranged on and secured to said member with the inner portions of their lateral sides in contact.

6. As a new article of manufacture, an elastic body having opposite concave and convex sides and substantially segmental in transverse section and provided with radially extending cells opening out through the concave side thereof.

In testimony whereof I affix my signature in presence of two witnesses.

McGARVEY E. TATE.

Witnesses:
 MAGGIE SHAW,
 MARIETTA FARRELL.